(12) United States Patent
Joiner et al.

(10) Patent No.: US 8,358,791 B2
(45) Date of Patent: Jan. 22, 2013

(54) DISTRIBUTED AUDIO SIGNAL PROCESSING SYSTEM HAVING LOGICAL CHANNEL GROUPS

(75) Inventors: James Steven Joiner, Suwanee, GA (US); Michael August Pocino, Marietta, GA (US); Scott David Orangio, Dacula, GA (US)

(73) Assignee: Polycom, Inc., San Jose, CA (US)

( * ) Notice: Subject to any disclaimer, the term of this patent is extended or adjusted under 35 U.S.C. 154(b) by 1244 days.

(21) Appl. No.: 12/136,671

(22) Filed: Jun. 10, 2008

(65) Prior Publication Data

US 2009/0307383 A1 Dec. 10, 2009

(51) Int. Cl.
*H04B 1/00* (2006.01)

(52) U.S. Cl. ................ 381/119; 381/109; 369/3; 369/4; 700/94

(58) Field of Classification Search .................. 381/119, 381/109; 369/3–4; 700/94
See application file for complete search history.

(56) References Cited

U.S. PATENT DOCUMENTS

| 4,630,517 A * | 12/1986 | Hall et al. ...................... 84/613 |
| 7,929,718 B1 * | 4/2011 | Gephardt et al. ............. 381/120 |
| 2008/0051920 A1 * | 2/2008 | Hori ................................ 700/94 |
| 2008/0219478 A1 * | 9/2008 | Aoki et al. ..................... 381/119 |

* cited by examiner

*Primary Examiner* — Disler Paul
(74) *Attorney, Agent, or Firm* — Wong, Cabello, Lutsch, Rutherford & Brucculeri, LLP

(57) ABSTRACT

A distributed audio signal processing system having a plurality of linked audio signal processing units is disclosed. Each audio signal processing unit has physical channels for receiving and sending local audio signals and a high bandwidth interface for exchanging audio signals with other linked audio signal processing units. Each of the physical channels of each of the audio signal processing units is mapped to a corresponding global channel. Global channels can be combined to form virtual channels that can be processed as a signal channel. Combinations of virtual channels can be grouped into logical channel groups that can be controlled as a group.

20 Claims, 6 Drawing Sheets

DISTRIBUTED AUDIO SIGNAL PROCESSING SYSTEM HAVING LOGICAL CHANNEL GROUPS

FIELD OF THE INVENTION

The disclosure relates generally to the area of audio signal mixing and processing and specifically to distributing the processing and mixing of audio signals among a plurality of linked audio signal processing units.

RELATED CASES

Reference is made to related patent applications entitled "Distributed Audio Signal Processing System" and "Distributed Audio Signal Processing System Having Virtual Channels," which have the same filing date and inventorship as the instant application and which are incorporated by reference.

BACKGROUND

Audio signal mixing and audio signal processing functionality is typically included in various types of audio mixing units, audio conferencing and video conferencing systems. Audio signal mixing can involve receiving a plurality of audio signals over an audio input from a microphone, for instance mixing two or more of these audio signals together and then routing the mixed audio signal(s) to one or more audio outputs, such as a loud speaker or a recording channel. Typically, audio signal mixing units include some functionality to program input signal gain levels and may also include programmable signal delay. But typically such signal mixing units do not include any complex signal processing functionality such as acoustic echo cancellation for instance. Both audio signal mixing and signal processing functionality is typically included in audio and video conferencing systems in order to mix two or more audio input signals, process them in some way (echo cancellation for instance) and send them to one or more particular audio outputs.

Commercially available audio mixing units are limited to mixing a finite number of audio signals. The audio signal mixing is usually limited by the scale/capability of the switching matrix associated with the unit. Depending upon the switching arrangement, typically eight or more audio inputs can be can be mixed and routed to eight or more audio outputs. In order to implement audio mixing systems that are capable of mixing large numbers of audio input signals, it is common practice to link individual audio signal mixing units together so that they can be controlled to mix a large number of audio inputs. A disadvantage in linking two or more audio signal mixers together is that the process of setting up the signal mixing assignments can become burdensome and error prone. In most cases, it is necessary when setting up the audio signal mix to keep track of input signals on a unit-by-unit basis as opposed to assigning the signals on a global basis. In other words, when setting up signal mixes in such a multi-unit arrangement it is necessary to specify which audio input signal on a particular unit is to be mixed with a particular audio signal either on the same unit or on another unit. Assigning mixes to input signals in such a non-global manner can be tedious at best and at worse is prone to assignment errors.

Units are commercially available that integrate audio signal mixing and signal processing systems so as to be suitable for use for audio and video conferencing applications. As with discrete signal mixing and signal processing units, integrated mixing and processing units are limited as to input signal mixing and processing capability. It therefore may be desirable to link individual, integrated audio conferencing units together to form a larger audio conferencing system. Graphical user interfaces are available that facilitate the assignment of signal mixes and signal processing in such large conferencing systems, but the signal mix assignment and the assignment of signal processing methods, as mentioned earlier, are manual in nature and operate using a block diagram or fixed signal path assignment process. An example graphical user interface is described in commonly owned patent application Ser. No. 10/644,670, the entire contents of which are incorporated herein by reference. For example, such GUIs typically necessitate keeping track of input signals on a unit-by-unit basis, as described above, rather than assigning the signals on a global basis.

The user interfaces employed to control such large, multi-unit audio conferencing systems operate to facilitate the assignment of actual, physical channel mixes between audio input signals associated with a single unit or associated with several separate, linked units. These user interfaces do not provide any facility for abstracting the actual, physical audio input signals over the entire conferencing system that will allow a user to easily assign or reassign mixes to the audio signals or to easily assign particular signal processing methods to different signals or groups of signals across the entire multi-unit system.

SUMMARY

Disclosed is a signal processing system having two or more signal processing units all of which are connected together by a communications link. The signal processing units operate to receive at least one pre-processed input signal over any of at least one physical input channels included on any one of the signal processing units, switch the pre-processed input signal from the physical input channel to any of a plurality of physical output channels included on the signal processing unit according to a pre-defined control command, and to route the pre-processed input signal to any one of a plurality of output devices connected to the physical output channel. Each of the plurality of linked signal processing units can include a physical channel to global channel mapping function and a virtual channel control command. Each of the signal processing units can operate to receive two or more input signals and to operate on the input signals according to instructions contained in the virtual channel control commands to create a single, composite output signal. Each of the units can further include a virtual channel control command and a logical channel group control command. According to such an embodiment, each of the signal processing units operate to receive two or more input signals and to operate on the input signals according to instructions contained in the virtual channel control command and the logical channel group control command to create a single, composite output signal.

DETAILED DESCRIPTION

Figure 1:
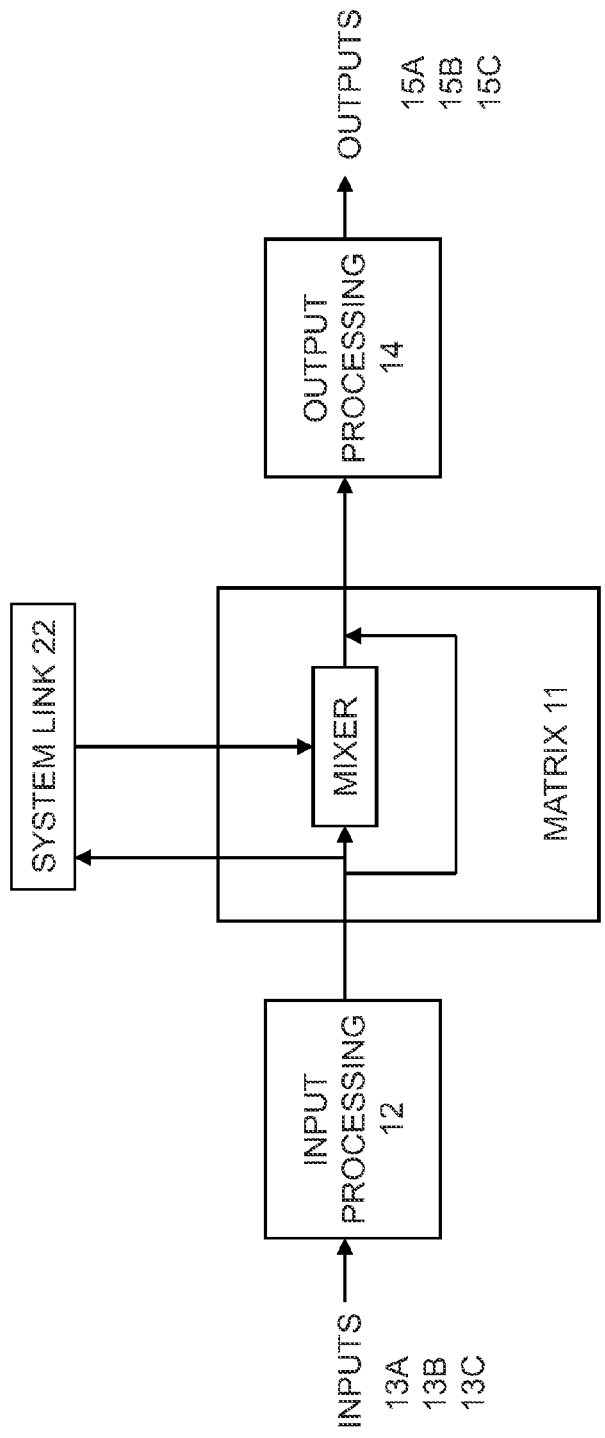
FIG. 1 is a block diagram of an audio conferencing unit.

Described herein a multimedia signal processing system, of which one type is an audio conferencing system (sometimes referred to as a teleconferencing system). However, the disclosed methods and systems can be easily implemented in a video conferencing system or employed to simply mix audio signals without any conferencing application by a skilled audio engineer. Referring now to FIG. 1, a signal processing unit labeled signal processing unit 10 is shown that includes a number of audio signal inputs 13A, 13B, and 13C, an input signal processing function 12, and output signal processing function 14, a number of audio signal outputs 15A, 15B, and 15C, a matrix processor 11 and a hi-bandwidth link 22. The audio signal inputs 13A, 13B and 13C can be a signal from a microphone, a telephone signal, an audio signal from a videoconference unit or any other type of input signal received by unit 10. An audio conferencing unit such as unit 10 typically supports a number of signal inputs and in the preferred embodiment the unit 10 is capable of receiving up to sixteen separate input audio signals. The input signals can be pre-processed by functionality included in the input processor block 12. Such pre-processing can include acoustic echo cancellation (AEC), noise cancellation (NC), automatic gain control (AGC), parametric equalization (PEQ), and feedback elimination to mention a few.

Continuing to refer to FIG. 1, the audio signal outputs 15A, 15B and 15C can be signals going to a telephone line, a signal going to a speaker and a signal going to an audio codec used in an audio or video conferencing unit respectively. These output signals are not limited to telephone, speaker or audio codec signals but can also be logic or control signals as well. The output signals can be post-processed by functionality included in the output processing block 14 which can include such processing as cross over filtering, graphic equalization (GEQ), delay, and signal fading to name a few. Signals received locally by the signal processing unit 10 via signal input lines 13A, 13B, and 13C can be routed to the matrix processor 11, which generally operates to mix two or more of these input signals according to control commands, described later with reference to FIGS. 2A & B, and to perform signal processing. The matrix processor 11 is also capable of mixing audio input signals received over the hi-bandwidth link 22 that are generated by a remote audio conferencing unit, not shown. The matrix processor 11 is capable of mixing local input signals with remotely generated input signals received by unit 11 over the hi-bandwidth link 22. All of the local input signals can be processed in some way by the input processing block 12 before they are routed to the matrix processor 11, routed to a local output 15a, 15b or 15c or before being routed directly over the hi-bandwidth link 22 to another remote audio conferencing unit not shown.

Figure 2A:
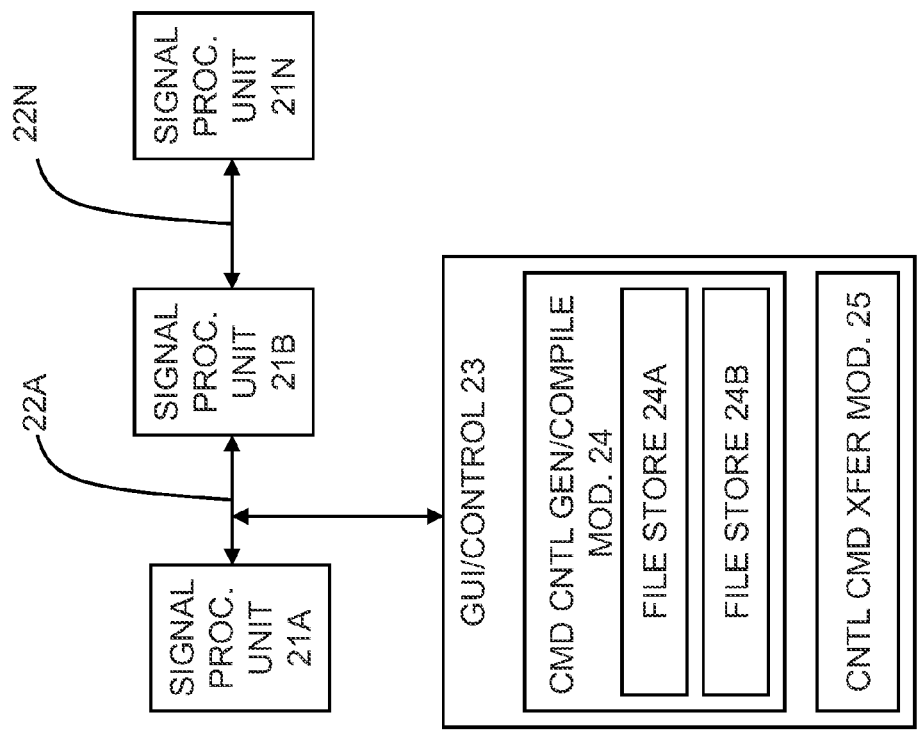
FIG. 2A is a block diagram of an audio conferencing system.

FIG. 2A is a block diagram of a signal processing system 20 having a plurality of signal processing units 21A to 21N each one of the units connected to another one of the units by a hi-bandwidth, bi-directional serial link 22A-N. Link 22 can be implemented as a bi-directional, point-to-point signal communication link to share audio and control signals between adjacent signal processing units, such as units 21A and 21B for instance. For a further implementation of a variation of the hi-bandwidth link, please refer to U.S. patent Ser. No. 10/897,318, entitled "A Conference Link Between a Speakerphone and a Video Conference Unit," filed Jul. 21, 2004, which is hereby incorporated by reference. Other unit connectively arrangements can be employed, but the point-to-point arrangement provides a combination of speed and low signal latency. Also shown in FIG. 2A is a block labeled control module 23, which can be a software module running on an appropriate computational unit that can be connected to the hi-bandwidth link 22 or to one of the signal processing units 21A to N. Control module 23 implements, among other things, a control command generation module 24 that facilitates the generation of commands (control commands) that are used in system 20 to control the operation of cross-point switches implemented in the matrix processors in each of the signal processing units 21A to 21N. The control command generation module 24 includes a control command file store 24A and a hardware control command file store 24B. The store 24A is a file that includes one or more control commands in source code form that can be parsed and re-compiled into hardware level commands by the control command generation module 24 or by similar functionality located in each signal processing unit 21A to N or in a master signal processing unit, which for the purpose of this description can be designated as unit 21A. The signal processing system 20 implements a tightly integrated, distributed signal processing matrix where any input signal or physical channel on any one of the signal processing units 21A to 21N can be routed to any one of the other signal processing units 21A to 21N to be mixed with a signal from yet another signal processing unit associated with a different physical channel, processed and played over any one of the units 21A to N. Such a distributed audio signal mixing and processing arrangement permits for maximum flexibility when selecting signals to mix and when determining how to process the signals. Therefore, the signal mixing and processing capabilities of the system are not limited to the capability of any particular unit, but are only limited to the collective capability of the system.

Each physical channel mentioned above is an actual channel that physically exists on each signal processing unit 21A to 21N that corresponds to a single audio input or audio output signal, such as a particular microphone signal or a particular loud speaker signal for instance. The number of physical channels included in the signal processing system 20 is determined by the number of physical channels associated with each signal processing unit 21A to 21N. Assuming for the purpose of this description, that the system 20 includes three units 21A, 21B and 21C (not shown) and that each unit has sixteen channels for a total of 48 channels in system 20. During a discovery phase (upon system 20 initialization or later), system 20 functionality identifies each of the units 21A to 21N that are included in the system 20 and identifies how many channels are included in each of the units 21A to 21N. At the completion of the system 20 discovery phase, each signal processing unit 21A to 21N is assigned an I.D., which in this case is an integer. The first unit identified can be unit "0," the second unit can be unit "1" and so forth. Also during the discovery process, physical channels associated with each unit 21A to N are assigned global physical channel IDs. These global physical channel designations are then employed when defining virtual channels in the control commands described previously with reference to FIG. 2A. The global physical channels are assigned sequential IDs starting with the first channel on the first conferencing unit and ending with the last channel on the last conferencing unit. So, for example, in the above case where there are three units 21A, B and C and each unit includes sixteen channels, the assignment of global IDs for the channels starts at "channel 1" and proceeds by increments of one to "channel 48". These physical channel IDs are stored in a structure associated with a matrix processor in each of the signal processing units 21A to N and will be described later in detail with reference to FIG. 2A.

The setup, control and management of the matrix processors in the system 20 can be greatly facilitated and simplified by abstracting the definition of the global physical channels in the system. The abstracted physical channel instance is termed a virtual channel and it can be defined to include one or more physical channels and each virtual channel can be controlled as though it is a single channel. Virtual channels can be employed in the signal processing system 20 to control the application of a particular parametric value (gain, AEC enable, fader), such as a fader parameter for instance, to all of the physical channels defined to be included in the virtual channel. In this case, setting the fader value of a virtual channel will have the effect of setting the fader parameter of all the physical channels in the virtual channels to a particular value. Four different types of virtual channels are supported by the signal processing system 20 of FIG. 2A; namely, mono virtual channels, stereo virtual channels, crossover virtual channels and stereo crossover virtual channels. In one embodiment, the physical channels assigned to a virtual channel are all the same physical channel type. So for instance, a particular virtual channel would be composed of one or more physical channels that are represented by only input microphone signals or only line output signals.

Control commands can be virtual channel definition commands, logical group definition commands or matrix parameter commands. The virtual channel definition commands are a type of control command that provides methods for defining and mapping a virtual channel to a physical channel. The virtual channel may be defined to include one or more physical channels and the virtual channel definition command can be a command to define a new virtual channel and its physical channel mapping, it can be a command to delete the definition of a virtual channel, or it can be a command to rename a virtual channel. A pair of virtual channel definition commands can be created to control the operation of the matrix processor 11 described with reference to FIG. 1. A first one of the pair of commands can include input signal information and the second one of the pair of commands can include output signal information. One or more virtual channel definition command pairs can be used to control the operation of the matrix processor 11 in FIG. 1. Alternatively, all of the instructions necessary to control the operation of the matrix processor 11 can be included in a single control command, but separating the two control commands permits greater flexibility. An example of the syntax for one type of virtual channel definition command is shown with reference to Table 1 below:

TABLE 1 vcdef <label> <vctype> <pctype> <num> [<num> ... ] <term>

The first argument in the virtual channel definition command syntax, as illustrated in Table 1, is the command type, which in this case is the type "vcdef" which indicates that the command relates is a virtual channel definition type command. The second argument in the syntax, <label>, is a user-defined text argument that is used to declare a name for a newly defined virtual channel. The name selected can be "table microphones" or "ceiling microphones" for instance. The next argument, <vctype>, is a system-defined text argument that defines the type of virtual channel (VC) that will be created. In one embodiment there are four VC types, a mono VC, a stereo VC, a crossover VC and a stereo crossover VC. The next argument in the syntax of the virtual channel definition command is <pctype>, which defines the type of physical channel included in the virtual channel. As described previously, a physical channel type is determined by the actual signal it is assigned to. Physical channel types can be a mic_in channel, a line_out channel, a pstn channel, a voip channel to name only a few. The next one or more arguments in the syntax is <num>. This argument is required to define the global channel index of the physical channel(s) included in each virtual channel in the audio conferencing system 20. This argument is an integer argument. For example, if a first and second audio conferencing unit are included in the system 20 and each unit includes 16 input channels and 16 output channels to the hi-bandwidth link 22 of FIG. 2A, the command shown below, with reference to Table 2, defines a stereo virtual channel consisting of the last microphone on the first unit and the first microphone on the second unit.

TABLE 2 vcdef "Stereo Mics" stereo mic_in 16 17

As previously described, with reference to FIG. 2A, one or more control commands can be included in a file that can be stored in control file store 24A in control command generation module 24.

In the case where an audio conferencing application requires that many audio signal inputs be processed and mixed, such as in a very large conference room, it can be advantageous to provide a means to view and to control multiple virtual channels as if they are a single channel. This is accomplished by combining one or more virtual channels into a logical channel group (although a group can exist with zero virtual channels). All or a subset of the virtual channels in a logical group can be controlled as a group or each virtual channel in a logical group may be controlled separately. One advantage in establishing logical groups of virtual channels is that volume control over a large number of virtual channels can be easily performed while at the same time the input gain levels of individual microphones or virtual channels can be calibrated or local sound reinforcement can be easily implemented for all of the virtual channels included in a logical group. Implementing the concept of virtual channels and logical groups facilitates a method of very flexible/dynamic control over an audio conferencing system such as system 20 of FIG. 2A. Since virtual channels can be members of more than one logical grouping, it is possible to very flexibly manage the way the signals associated with any particular virtual channel are processed. As a rule, all of the members of a single logical group do not have to be of the same physical or virtual channel type. The syntax for a logical group definition command is very similar to the syntax of a virtual channel definition command and so will not be described here in any detail other than to mention that it includes a label that defines a new logical group, a label that specifies the name of the new logical group and the names of the virtual channels that are members of the logical group.

Matrix parameter commands can be created to control parameters applied to signals by the matrix processor 11 of FIG. 1. Parameter commands can turn on or off or adjust such functionality as fading or signal gain for instance. The syntax for such commands is much the same as for virtual channel definition commands and so will not be explicitly described here. All of the previously described user defined control commands are parsed and re-compiled into hardware level commands by the control command generation module 24 in FIG. 2A or the control commands are down loaded to a master audio conferencing unit, such as unit 21A for instance, where a processor can convert these commands to hardware level instructions. These hardware level instructions are then down loaded into memory associated with a matrix processor in each audio conferencing unit 21A to 21N in order to control the mixing functionality in each unit 21A to 21N.

Continuing to refer to FIG. 2A, as previously mentioned, the control commands are included in the files that are transferred to and stored in the matrix processors of each of the audio conferencing units 21A to 21N and these commands are employed by each matrix processor and the input and output processing modules 12 and 14 respectively to perform mixing and signal processing operations on audio signals according to the arguments included in each control command.

The system can include a graphical user interface (GUI) to facilitate the generation of control commands, define the relationships between local physical channels, global physical channels, virtual channels and logic groups, display the map structure showing these relationships, and the like. An example graphical user interface is described in commonly owned patent application Ser. No. 10/644,670, the entire contents of which are incorporated herein by reference. According to the instant disclosure, the GUI does not necessitate keeping track of input signals on a unit-by-unit basis, but rather signals are assigned on a global basis.

Figure 2B:
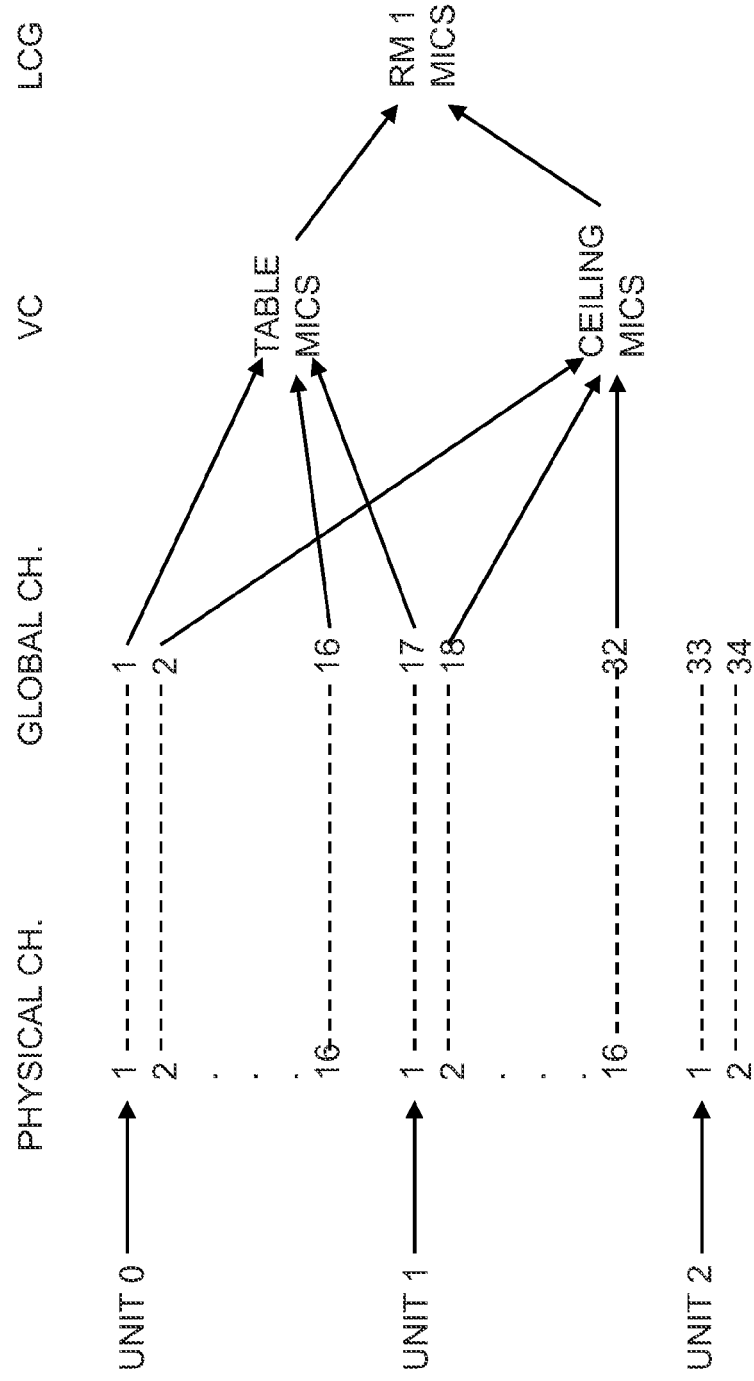
FIG. 2B is an illustration of a physical channel to logical channel map.

FIG. 2B is an illustration of a map structure 29 that defines the relationships between local physical channels, global physical channels, virtual channels and logic groups. The relationship between local physical channels, global physical channels, virtual channels and logic groups can be implemented in system 20 as a lookup table, a memory map, a matrix or some other suitable programming structure. The structure illustrated in FIG. 2B lists three conferencing units "0", "1" and "2". Each conferencing unit "0", "1" and "2" has sixteen physical channels 1-16 for a total of forty-eight physical channels. Each of these forty-eight physical channels map to a different one of forty-eight global channels. The global channels in the structure 29 are assigned consecutive integer labels, such as "1", "2", "3" . . . "48" for instance, but the global channels can be assigned non-consecutive integer labels. The import aspect of this assignment of this assignment is that each physical channel is defined to be associated with a separate global channel. Each global channel can be associated with a particular virtual channel (VC). In this case, global channels "1", "16" and "17" are mapped to the virtual channel associated with the table microphones connected to either a particular conferencing unit in a conferencing system or to all of the table microphones connected to the conferencing system. Further, structure 29 shows that global channels "2", "18" and "32" are mapped to the virtual channel associated with the ceiling microphones. And finally, the VC associated with the table microphones and the VC associated with the ceiling microphones are mapped to a logical channel group called "RM 1 MICS", which in this case represents all of the microphones in a particular room.

Figure 3:
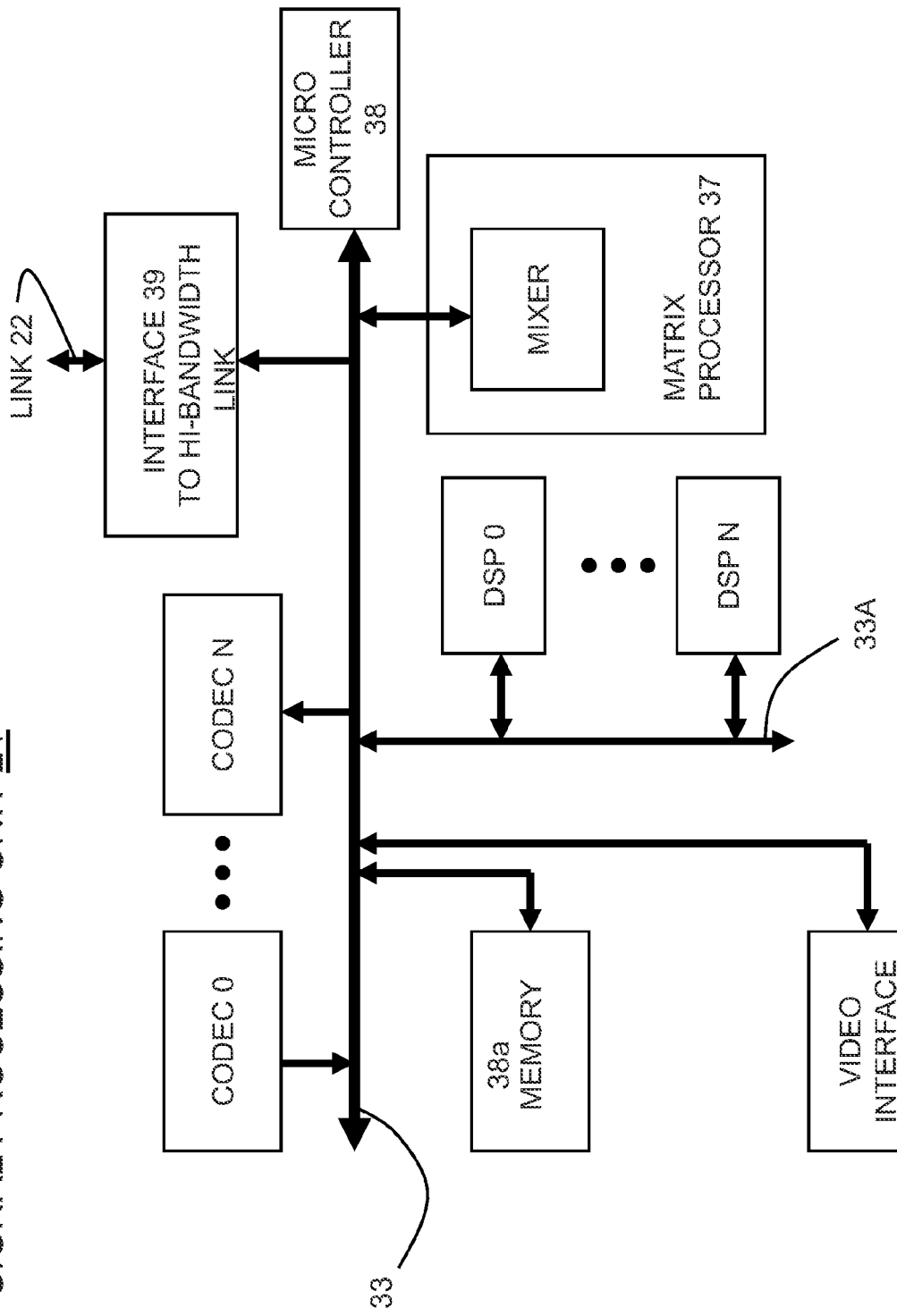
FIG. 3 is a functional block diagram showing one audio conferencing unit.

FIG. 3 is a functional block diagram of any one of the signal processing units 21A to 21N. In the preferred embodiment, the signal processing units are all audio conferencing units and so for the purpose of this description, the signal processing unit is labeled audio conferencing unit 21. Audio conferencing unit 21 has a number of codec's 0-N that receive local audio input signals from microphones and other input units, for instance, and that send audio output signals to loudspeakers, recording units or other units that use audio output signals and which are connected to the codecs. Local audio input signals are operated on by the codecs and subsequently passed over a unit bus 33 to one of a plurality of digital signal processors (DSP) 0 to N. The number of DSPs included in the unit 21 is dictated by the number of audio input channels that the unit 21 implements. In the preferred embodiment, each DSP is partitioned to process two channels of microphone or signal line inputs, two channels of signal line outputs, two channels of sub-mixes, and two channels of video or other codec signals. Therefore, in the event that the audio conferencing unit 21 is capable of processing sixteen signal channels, eight DSPs are included in the audio conferencing unit 21. The DSPs 0-N are all connected to a hi-speed bus 33A that operates to transport signals between the DSPs 0-N. Further, the DSPs operate, according to commands sent to them by a microcontroller 38, on the local audio input signals to perform, among other things, acoustic echo cancellation (AEC), noise cancellation (NC), automatic gain control (AGC) and feedback elimination. The DSPs also operate on the audio output signals to perform, among other things, attenuation, DTMF generation, line filtering, graphic equalization, parametric equalization, delay and fading. After being operated on by one or more of the DSPs 0-N, local audio input signals are routed over bus 33 to the matrix processor 37 and to the hi-bandwidth link interface 39 where the signals are transmitted over the hi-bandwidth link 22 for availability to any of the other audio conferencing units in the system. While DSPs 0 to N are illustrated as separate from matrix processor 37, they can be combined as well. The matrix processor 37 utilizes the control commands described earlier with reference to FIG. 2A to mix two or more local audio input signals or to mix one, or more local audio input signals with one or more audio signals received over the hi-bandwidth link 22 from another audio conferencing unit, or to mix two of more audio signals received over the hi-bandwidth link 22, for instance. Finally, the microcontroller 38 generally operates to convert the control commands into a format that can be used by the audio conferencing unit 21 hardware, such as the matrix processor and the DSPs, in order to mix and process the input and output signals. These control commands can be stored in memory 38A, where they can be available to be modified from time to time, and can be thought of as taking the form of the map structure 29 of FIG. 2B.

Continuing to refer to FIG. 3, each of the audio signals is placed into an audio packet for transmission over the hi-bandwidth link 22. These packets of audio information can be formatted to include a header with the physical channel I.D. information described earlier with reference to FIG. 2A, for instance, and a body which includes audio signal information which represents some number of digital samples of an audio signal. These packets are generated by the hi-bandwidth link interface 39. More specifically, each of the audio packets generated by an audio conferencing unit 21A to 21N for transmission over the hi-bandwidth link 22 includes a header with the I.D. of the physical channel that includes the global physical channel number, which in this case can be any of the global channels 1 to 48. All of the audio packets generated by each audio conferencing unit 21A to 21N are placed on the hi-bandwidth link 22 for transmission over the link to be available to all of the other audio conferencing units 21A to 21N for mixing and processing at each unit. The physical channel I.D. of each audio packet received by each audio conferencing unit 21A to 21N is examined by the hi-bandwidth link interface 39 to determine whether or not it is used in a mix by that unit or whether it is merely processed and/or played by that unit, and if so, the audio information contained in the body of the audio packet is routed to the matrix processor 37 to be mixed or routed to one of the DSPs 0 to N for processing before being sent to a codec. The hardware level commands described earlier with reference to FIG. 2A, which are stored in the memory 38A or memory dedicated to the matrix processor, are employed by the matrix processor 37 at setup time to set the cross-point switches and to set certain parameters, such as gain, associated with that cross-point.

In one embodiment, if audio packets containing audio information assigned to the global channels 16 and 17 are available at the input to the matrix processor 37 and if the matrix processor 37 is programmed to combine global input channels 16 and 17 into a single physical line output channel, a line output associated with a particular loudspeaker or set of loudspeakers for instance, then the matrix processor 37, after receiving signals on these channels, mixes them to form a single, composite signal and routes this composite signal, possibly via a DSP, to a pre-set output line associated with a particular loud speaker for instance or the single, composite signal can be routed back to the matrix processor 37 for sub-mixing. As mentioned previously with reference to FIG. 2A, it is often convenient to be able to refer to a group of virtual channels and control a group of virtual channels with a single command. Logical channel groups are used to create a single object made up of loosely associated virtual channels. Once a logical channel group has been created, all commands to the group will affect the virtual channels that are members of the group. In another embodiment, if global channels 16 and 17 are members of a first virtual channel and if physical channels 21 and 35 are members of a second virtual channel, and if both the first and second virtual channels are members of a logical channel group referred to as "room one mics", then it is possible to configure and control all of the microphones (16, 17, 21 & 35) in room one at the same time by operating on the "room one mics" logical channel group by, for instance, setting the volume control to a particular value.

Figure 4A:
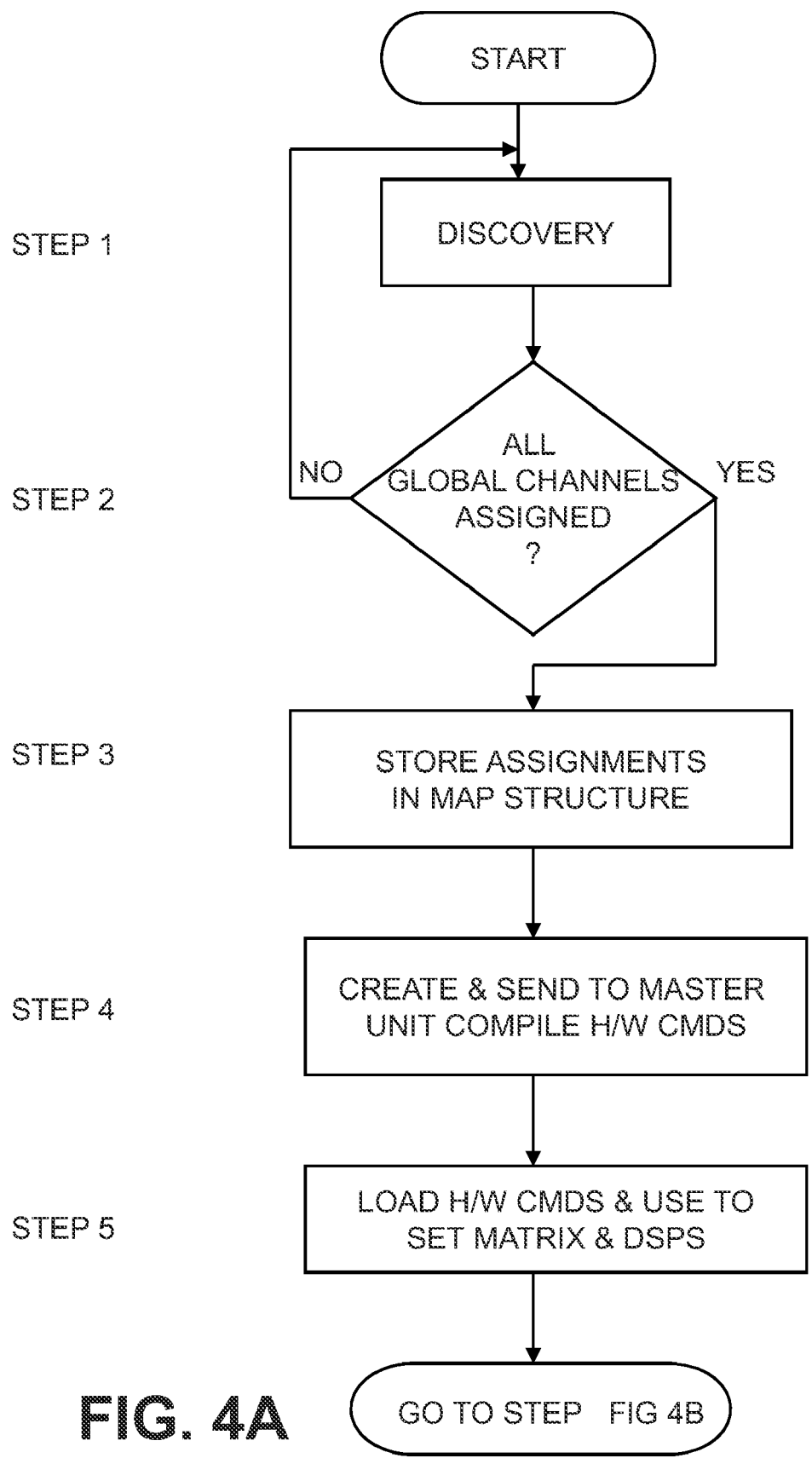
FIGS. 4A and 4B is a logical flow diagram showing physical channel to global channel mapping and signal processing.
Figure 4B:
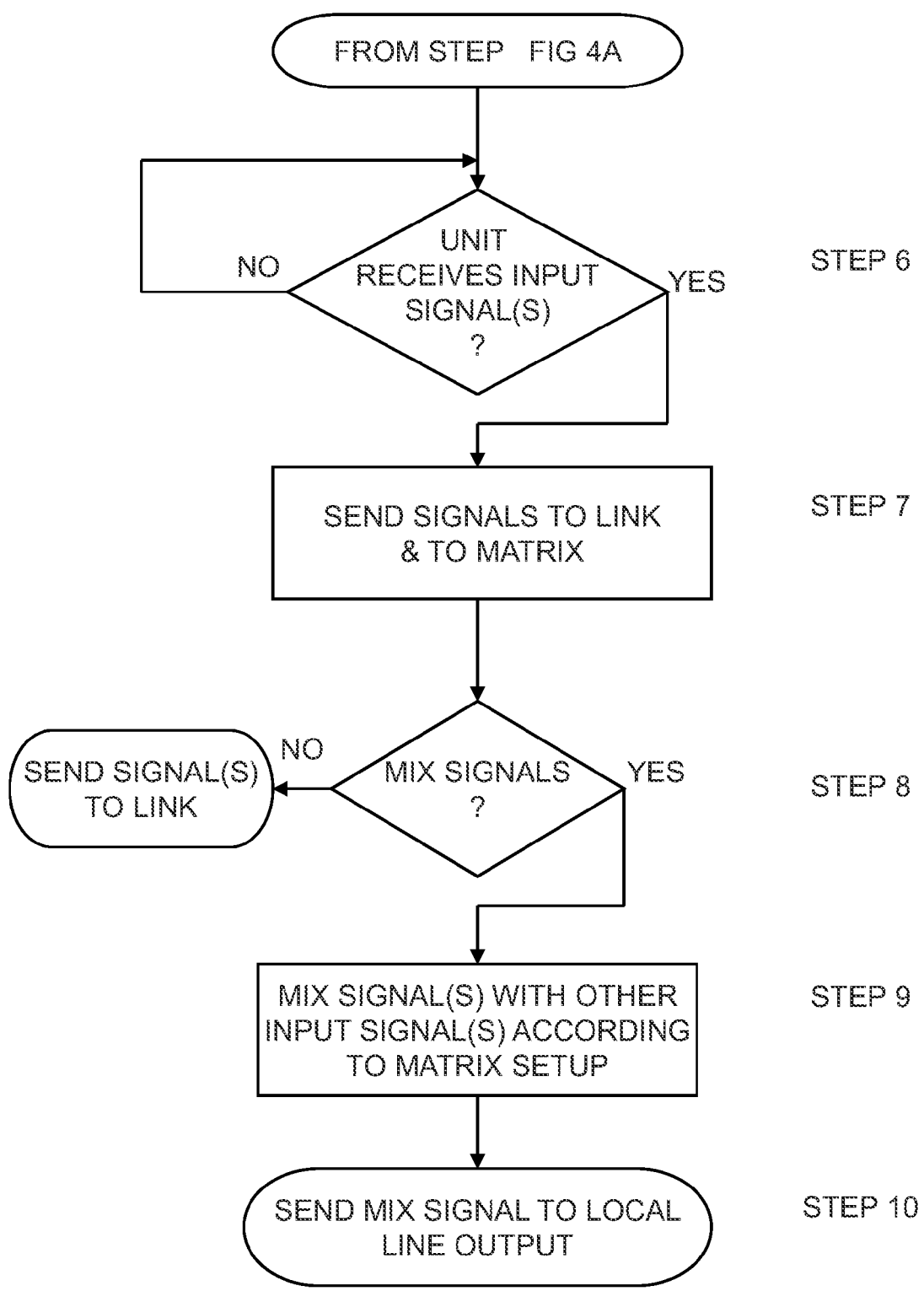

Referring now to FIG. 4A, which is a logical flow diagram showing the steps involved in physical channel to global channel mapping and signal processing. After at least one signal processing unit 21 in FIG. 2A is connected, via a hi-bandwidth link 22 in FIG. 2 to the audio conferencing system 20 and powered up, in step 1 a system discovery process starts that identifies the at least one signal processing unit 21 connected to the link 22 and assigns an identity to the unit and assigns a global physical channel identity to each one of the channels associated with the signal processing unit 21. A process loop between step 1 and step 2 continues until all of the physical channels are assigned a global identify, at which point in step 3, the global physical channel identities can be stored in a map structure in either a master audio conferencing unit or in each one of the signal processing units 21A to 21N described in FIG. 2A. In step 4, control commands are created and then sent to either a master audio conferencing unit to be compiled as hardware level control commands or sent to each of the individual signal processing units 21A to 21N to be compiled as hardware level control commands. In step 5, these hardware level commands are employed by each of the signal processing units 21A to N to set the signal mixing operation of the matrix (and the DSP function). Then in step 6, locally generated input signals are received or not, and if not the process loops on step 6. In step 7, after input signals are received, they are routed to both the hi-bandwidth link 22 and to the matrix processor 37. If in step 8 the matrix processor 37 receives two or more signals (generated either locally or remotely) that it is programmed to mix, then in step 9 these two or more signals will be mixed to form a single, composite signal and then in step 10 routed to the local outputs of the audio conferencing unit. On the other hand, if in step 8 the matrix processor 37 is not programmed to mix any one of the two or more signals it receives, then these signals will be merely routed to the hi-bandwidth link 22 and made available to any other signal processing unit 21A to N connected to the link 22.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of processing audio signals in a distributed audio signal processing system, comprising:
    linking together a plurality of audio signal processing units, each audio signal processing unit comprising:
        a high-bandwidth link interface for exchanging audio signals with other linked audio signal processing units;
        a plurality of physical input channels for receiving local audio signals; and
        a matrix processor;
    assigning a corresponding global channel to each of the physical input channels of all of the linked audio signal processing units;
    creating and storing a map structure that relates each physical input channel to its corresponding global channel;
    defining one or more virtual channels comprising two or more global channels;
    generating one or more logical channel group control commands defining one or more logical channel groups each comprising two or more virtual channels and transmitting the logical channel group control commands to the audio signal processing units; and
    at the matrix processor of at least one of the audio signal processing units, operating on an audio signal based on the logical channel group control command and the map structure.

2. The method of claim 1, wherein operating comprises mixing two or more audio signals to form one or more output signals.

3. The method of claim 1, wherein operating comprises performing acoustic echo cancellation, noise cancellation, acoustic gain control, parametric equalization or feedback cancellation.

4. The method of claim 1, wherein generating one or more logical channel group control commands is responsive to inputs to a graphical user interface.

5. The method of claim 1, further comprising displaying a representation of the map structure at a graphical user interface.

6. The method of claim 1, further comprising displaying a representation of the one or more logical channel groups at a graphical user interface.

7. A audio signal processing system, comprising:
    a plurality of linked audio signal processing units, each audio signal processing unit comprising:
        a high-bandwidth link interface for exchanging audio signals with other linked audio signal processing units;

a plurality of physical input channels for receiving local audio signals; and
a matrix processor; and
a control module programmed to:
assign a corresponding global channel for each of the physical input channels of all of the linked audio signal processing units;
create and store a map structure relating each physical input channel to its corresponding global channel;
define one or more virtual channels each comprising one or more global channels;
generate one or more logical channel group control commands defining one or more logical channel groups each comprising one or more virtual channels; and
transmit the logical channel group control commands to the audio signal processing units;
wherein the matrix processors of the audio signal processing units are programmed to operate on an audio signal based on the logical channel group control command and the map structure.

8. The system of claim 7, wherein operating comprises mixing two or more audio signals to form one or more output signals.

9. The system of claim 7, wherein operating comprises performing acoustic echo cancellation, noise cancellation, acoustic gain control, parametric equalization or feedback cancellation.

10. The system of claim 7, further comprising a graphical user interface programmed to display a representation of the one or more logical channel groups.

11. The system of claim 7, further comprising a graphical user interface programmed to display a representation of the map structure.

12. The system of claim 11, further comprising a graphical user interface programmed to display a representation of the logical channel group control commands.

13. A distributed audio signal processing system, comprising:
a plurality of linked audio signal processing units, each audio signal processing unit comprising:
a high-bandwidth link interface for exchanging audio signals with other linked audio signal processing units;
a plurality of physical input channels for receiving local audio signals; and
a matrix processor; and
a controller programmed to:
assign a corresponding global channel for each of the physical input channels of all of the linked audio signal processing units;
define one or more virtual channels each virtual channel comprising one or more global channels; and
generate one or more logical channel group control commands defining one or more logical channel groups comprising one or more virtual channels;
wherein the matrix processor of each audio signal processing system operates to processes all virtual channels of a logical channel group in response to receiving a logical channel group control command.

14. The audio signal processing system of claim 13, further comprising a graphical user interface for displaying a representation of the virtual channels and logical channel groups.

15. An audio signal processing unit comprising:
a high-bandwidth link interface for exchanging audio signals with other linked audio signal processing units;
a plurality of physical input channels for receiving local audio signals;
a control module programmed to:
assign a corresponding global channel for each of the physical input channels of all of the linked audio signal processing units;
create and store a map structure relating each physical input channel to its corresponding global channel;
define one or more virtual channels each comprising one or more global channels;
generate one or more virtual channel control commands defining one or more virtual channels each comprising one or more of the global channels;
generate one or more logical channel group control commands defining one or more logical channel groups each comprising one or more of the virtual channels; and
transmit the logical channel group control commands to the linked audio signal processing units;
a microcontroller programmed to receive and process:
virtual channel control commands, and
logical channel group control commands; and
a matrix processor programmed to operate on one or more audio signals based on the virtual channel control commands, the logical channel group control commands and the map structure.

16. The audio signal processing unit of claim 15, wherein the matrix processor comprises a cross-point switch.

17. The audio signal processing unit of claim 16, wherein the virtual channel control commands and the logical channel control commands control the cross-point switch.

18. A controller for a distributed audio signal processing system, comprising:
a control module programmed to:
identify a plurality of linked audio signal processing units, each audio signal processing unit comprising:
a high-bandwidth link interface for exchanging audio signals with other linked audio signal processing units;
a plurality of physical input channels for receiving local audio signals; and
a matrix processor; and
assign a global channel corresponding to each of the physical input channels;
define one or more virtual channels each virtual channel comprising one or more global channels;
define one or more logical channel groups comprising one or more virtual channels;
generate one or more processing commands specifying a processing operation for all virtual channels of a logical channel group control command; and
transmit the processing commands to the audio signal processing units;
wherein the matrix processor of each linked audio signal processor operates on the audio signals based on the transmitted logical channel group control commands.

19. The controller of claim 18, wherein generating one or more processing commands is responsive to inputs to a graphical user interface.

20. The controller of claim 18, further comprising a graphical user interface for displaying a representation of the virtual channels and the logical channel groups.

* * * * *